US012732130B2

(12) United States Patent
Shimizu et al.

(10) Patent No.: US 12,732,130 B2
(45) Date of Patent: Sep. 8, 2026

(54) ELECTRIC POWER CONVERSION DEVICE, MOTOR DRIVING DEVICE, AND REFRIGERATION CYCLE APPLICATION APPARATUS

(71) Applicant: Mitsubishi Electric Corporation, Tokyo (JP)

(72) Inventors: Yuichi Shimizu, Tokyo (JP); Kazunori Hatakeyama, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 262 days.

(21) Appl. No.: 18/695,415

(22) PCT Filed: Oct. 28, 2021

(86) PCT No.: PCT/JP2021/039843
§ 371 (c)(1),
(2) Date: Mar. 26, 2024

(87) PCT Pub. No.: WO2023/073871
PCT Pub. Date: May 4, 2023

(65) Prior Publication Data
US 2025/0219566 A1 Jul. 3, 2025

(51) Int. Cl.
*H02P 27/00* (2006.01)
*F25B 31/02* (2006.01)
(Continued)

(52) U.S. Cl.
CPC .............. *H02P 29/50* (2016.02); *F25B 31/02* (2013.01); *H02P 27/085* (2013.01); *H02P 2201/09* (2013.01)

(58) Field of Classification Search
CPC ...... H02P 29/50; H02P 2201/09; H02P 27/00; F25B 31/02; F24F 11/88
See application file for complete search history.

(56) References Cited

U.S. PATENT DOCUMENTS

2013/0342139 A1* 12/2013 Shimomugi ............ H02P 27/00 318/400.3
2014/0177302 A1 6/2014 Sung et al.
(Continued)

FOREIGN PATENT DOCUMENTS

JP 2006-242742 A 9/2006
JP 2007-236034 A 9/2007
(Continued)

OTHER PUBLICATIONS

Extended European Search Report dated Nov. 21, 2024, issued for the corresponding European Patent Application No. 21962419.4.
(Continued)

*Primary Examiner* — Cortez M Cook
(74) *Attorney, Agent, or Firm* — Posz Law Group, PLC

(57) ABSTRACT

An electric power conversion device is a device for supplying an output voltage to a load from output terminals, and includes a rectifier circuit to rectify an AC voltage and to output the rectified voltage, a booster circuit to supply the output voltage to the output terminals, a voltage detector to output a voltage detection value indicating the output voltage, and a controller. The booster circuit includes a reactor connected to the rectifier circuit, a smoothing capacitor to smooth the rectified voltage, thereby generating the output voltage, and a switching element to short-circuit the reactor. The controller controls a conduction period of the switching element based on the voltage detection value so that a first pulsation frequency which is a frequency of pulsation of the output voltage is higher than a second pulsation frequency which is a frequency of pulsation of the rectified voltage.

11 Claims, 12 Drawing Sheets

(51) Int. Cl.
*H02P 27/08* (2006.01)
*H02P 29/50* (2016.01)

(56) References Cited

U.S. PATENT DOCUMENTS

| | | | | |
|---|---|---|---|---|
| 2014/0232309 | A1 | 8/2014 | Zhou et al. | |
| 2023/0090386 | A1* | 3/2023 | Takigawa | F24F 11/88<br>318/504 |

FOREIGN PATENT DOCUMENTS

| | | | |
|---|---|---|---|
| JP | 2012-065399 | A | 3/2012 |
| JP | 5304937 | B2 | 10/2013 |
| JP | 2017-204915 | A | 11/2017 |
| WO | 2016/098160 | A1 | 6/2016 |

OTHER PUBLICATIONS

International Search Report of the International Searching Authority dated Dec. 7, 2021 for the corresponding International Application No. PCT/JP2021/039843 (and English translation).

Office Action dated Aug. 6, 2024 issued in connection with Japanese Patent Application No. 2023-555984 (and English translation).

* cited by examiner

60a
TARGET VOLTAGE Vta
VOLTAGE DETECTION VALUE Vdc
61
AVERAGE VALUE CALCULATION UNIT
+
−
62
PI CONTROLLER
DUTY COMMAND VALUE
COMPARATIVE EXAMPLE

COMPARATIVE EXAMPLE
VOLTAGE [V]
1000
800
600
400
Vta
Vav
VOLTAGE AFTER BOOSTING
PEAK VALUE
VOLTAGE BEFORE BOOSTING
0
0.02
0.04
0.06 [sec]
DUTY
1.0
0.8
0.6
0.4
0.2
0
PI CONTROL
0
0.02
0.04
0.06 [sec]

Figure 4:
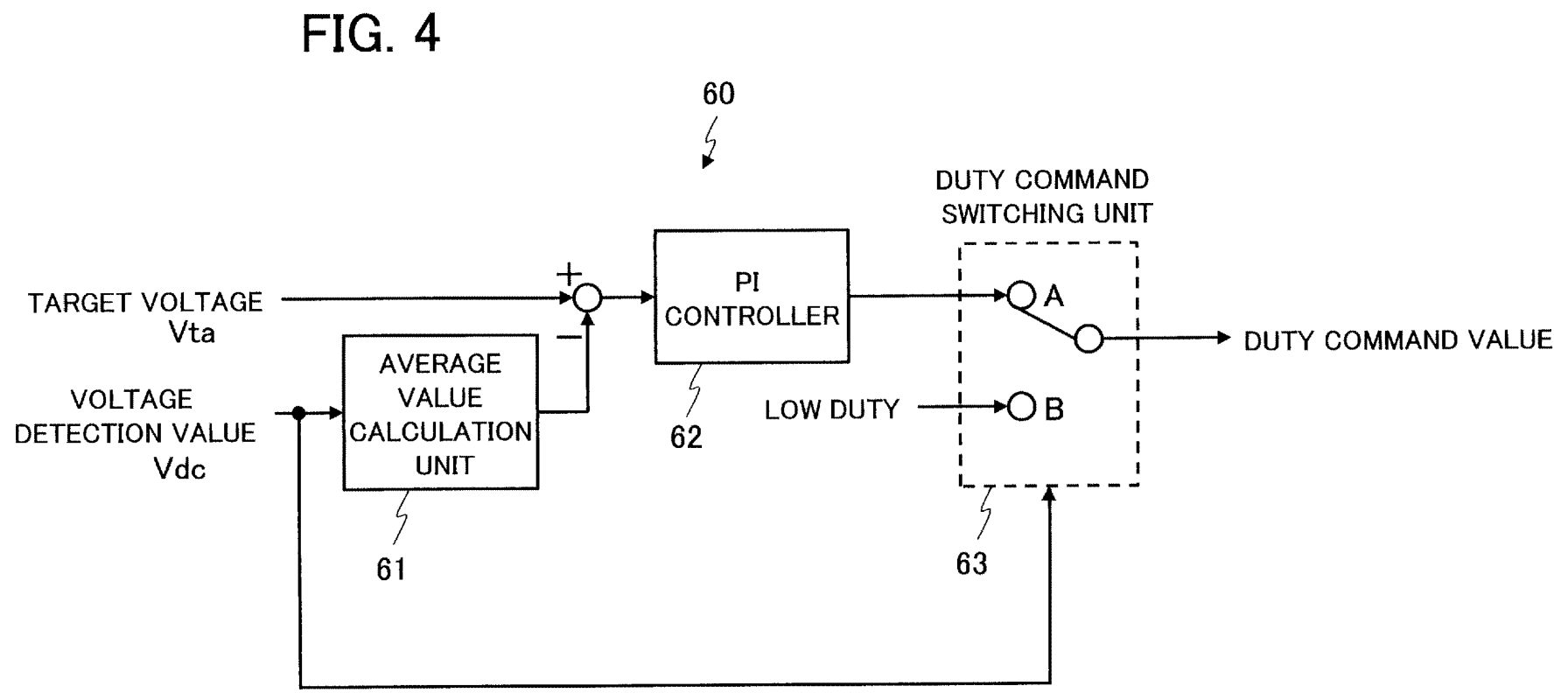

TARGET VOLTAGE Vta

VOLTAGE DETECTION VALUE Vdc

AVERAGE VALUE CALCULATION UNIT

61

+

−

PI CONTROLLER

62

LOW DUTY

DUTY COMMAND SWITCHING UNIT

A

B

63

DUTY COMMAND VALUE

FIG. 5

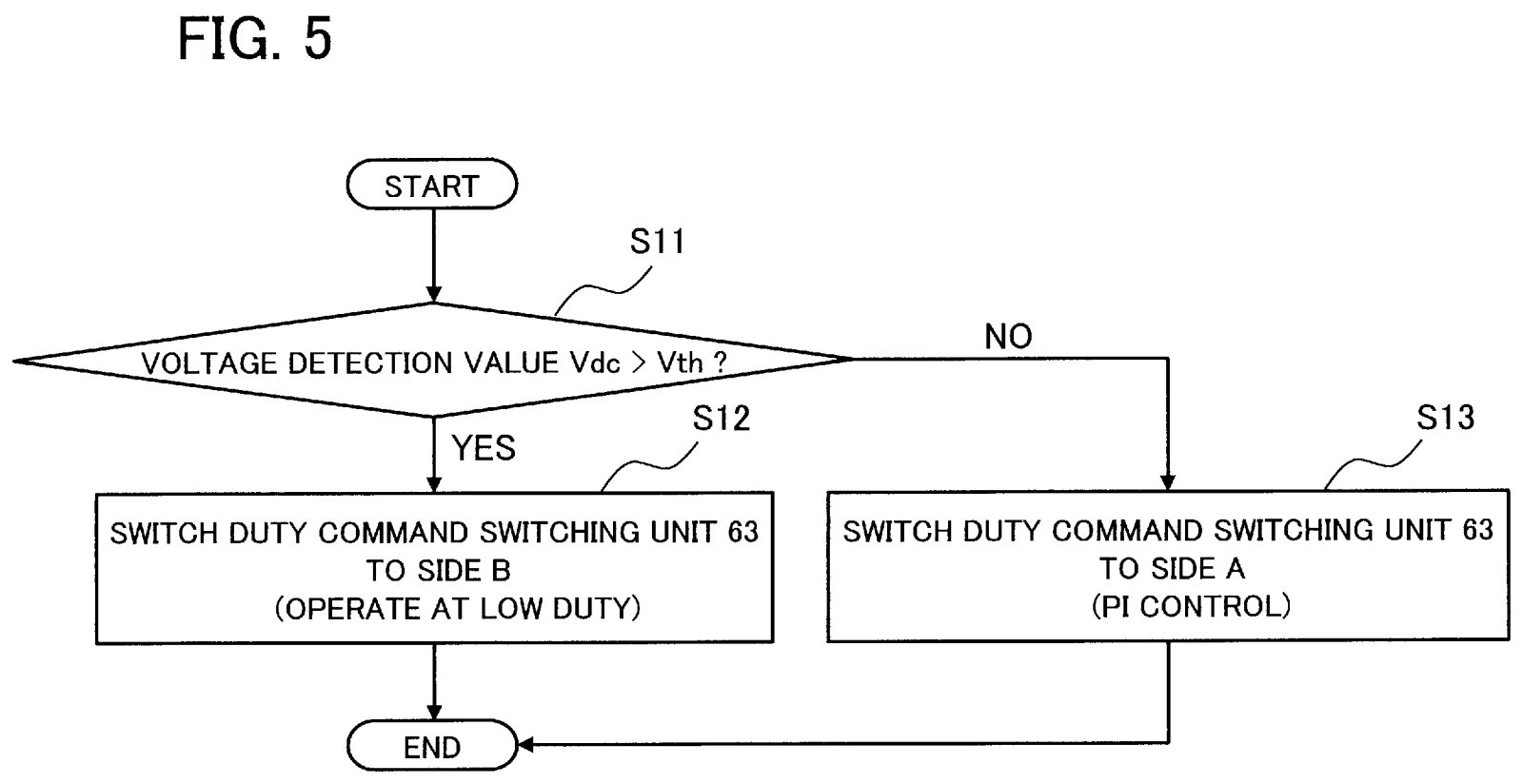

START

S11

VOLTAGE DETECTION VALUE Vdc > Vth ?

YES

S12

SWITCH DUTY COMMAND SWITCHING UNIT 63 TO SIDE B (OPERATE AT LOW DUTY)

NO

S13

SWITCH DUTY COMMAND SWITCHING UNIT 63 TO SIDE A (PI CONTROL)

END

FIRST EMBODIMENT
VOLTAGE [V]
1000
800
600
400
Vta
Vav
VOLTAGE AFTER BOOSTING
VOLTAGE BEFORE BOOSTING
PEAK VALUE IN COMPARATIVE EXAMPLE
PEAK VALUE IN FIRST EMBODIMENT
0
0.02
0.04
0.06 [sec]
DUTY
1.0
0.8
0.6
0.4
0.2
0
0
0.02
0.04
0.06 [sec]
PERIOD WHEN Vdc ≤ Vth PI CONTROL
PERIOD WHEN Vdc > Vth LOW DUTY 60b
TARGET VOLTAGE Vta
VOLTAGE DETECTION VALUE Vdc
+
−
65
PI CONTROLLER
66
UPPER/LOWER LIMIT LIMITATION UNIT
DUTY COMMAND VALUE
STOP INTEGRATION WHEN UPPER/LOWER LIMIT VALUE IS REACHED
GAIN SWITCHING UNIT
64

START
S21
VOLTAGE DETECTION VALUE Vdc > Vth ?
YES
NO
S22
TEMPORARILY STORE INTEGRAL VALUE OF PI CONTROL
S23
SET GAIN OF PI CONTROL AT Gb (Gb > Ga)
S24
VOLTAGE DETECTION VALUE Vdc1 OF PREVIOUS TIME > Vth ?
YES
NO
S25
SET TEMPORARILY STORED INTEGRAL VALUE AS INTEGRAL VALUE OF PI CONTROL
S26
SET GAIN OF PI CONTROL AT Ga (Gb > Ga)
S27
SET GAIN OF PI CONTROL AT Ga (Gb > Ga)
END

VOLTAGE [V]
PEAK VALUE IN SECOND EMBODIMENT
PEAK VALUE IN COMPARATIVE EXAMPLE
Vta
1000
Vav
VOLTAGE AFTER BOOSTING
800
600
VOLTAGE BEFORE BOOSTING
400
0
0.02
0.04
0.06 [sec]
SECOND EMBODIMENT
1.0
0.8
0.6
DUTY
0.4
PI制御
0.2
0
PERIOD WHEN Vdc ≤ Vth GAIN Ga
PERIOD WHEN Vdc > Vth GAIN Gb, Gb > Ga 400 REFRIGERATION CYCLE APPLICATION APPARATUS
300 MOTOR DRIVING DEVICE
30
100
200
20
31
P
34
41
202
206
203
205
10
51
207
40
208
Vdc
33
32
INVERTER
201
204
N
42
60
CONTROLLER COMPARATIVE EXAMPLE
MOTOR CURRENT (U-PHASE) [A]
LOW-FREQUENCY BEAT
60
40
20
0
-20
-40
-60
7.80
7.85
7.90
7.95
8.00
[sec]

SMOOTHING CAPACITOR TERMINAL VOLTAGE [V]
280
275
270
265
7.80
7.85
7.90
7.95
8.00
[sec]

ELECTRIC POWER CONVERSION DEVICE, MOTOR DRIVING DEVICE, AND REFRIGERATION CYCLE APPLICATION APPARATUS

CROSS-REFERENCE TO RELATED APPLICATION

This application is a U.S. national stage application of PCT/JP2021/039843 filed Oct. 28, 2021, the contents of which are incorporated herein by reference.

TECHNICAL FIELD

The present disclosure relates to an electric power conversion device, a motor driving device, and a refrigeration cycle application apparatus.

BACKGROUND

There has been proposed an electric power conversion device that supplies a DC voltage converted from an AC voltage, as an output voltage, from output terminals to a load (see Patent Reference 1, for example). This electric power conversion device includes a rectifier circuit and a boost chopper circuit. The boost chopper circuit includes a reactor connected to the rectifier circuit, a smoothing capacitor for reducing pulsation of the output voltage, and a switching element for short-circuiting the reactor. Although using a high-capacitance smoothing capacitor is desirable for further reducing the pulsation of the output voltage, the smoothing capacitor increases in volume in this case.

PATENT REFERENCE

Patent Reference 1: Japanese Patent Application Publication No. 2012-65399

If the capacitance of the smoothing capacitor is reduced in the above-described electric power conversion device, the pulsation of the output voltage increases, and consequently, a beat phenomenon becomes likely to occur, and an element breakdown in an inverter as the load becomes likely to occur.

SUMMARY

An object of the present disclosure is to provide an electric power conversion device capable of reducing the pulsation of the output voltage, a motor driving device including the electric power conversion device, and a refrigeration cycle application apparatus including the motor driving device.

An electric power conversion device in the present disclosure is a device for supplying an output voltage to a load from output terminals, and includes a rectifier circuit to rectify an AC voltage and to output a rectified voltage, a booster circuit to supply the output voltage to the output terminals, a voltage detector to detect the output voltage and to output a voltage detection value indicating the output voltage, and a controller. The booster circuit has a reactor connected to the rectifier circuit, a smoothing capacitor to smooth the rectified voltage, thereby generating the output voltage, and a switching element to short-circuit the reactor during a conduction period which is a period of an ON state of the switching element. The controller controls the conduction period of the switching element based on the voltage detection value so that a first pulsation frequency which is a frequency of pulsation of the output voltage is higher than a second pulsation frequency which is a frequency of pulsation of the rectified voltage.

A motor driving device in the present disclosure includes the above-described electric power conversion device and an inverter that converts the output voltage to an AC voltage and supplies the AC voltage to a motor.

A refrigeration cycle application apparatus in the present disclosure includes the above-described motor driving device and a refrigeration cycle device having a motor driven by the motor driving device.

According to the present disclosure, the pulsation of the output voltage can be reduced, and the beat phenomenon and the element breakdown in the inverter as the load can be made unlikely to occur.

BRIEF DESCRIPTION OF THE DRAWINGS

FIG. 4 is a block diagram showing the configuration of a controller of the electric power conversion device according to the first embodiment.

FIG. 5 is a flowchart showing the operation of the controller of the electric power conversion device according to the first embodiment.

DETAILED DESCRIPTION

An electric power conversion device, a motor driving device and a refrigeration cycle application apparatus according to each embodiment will be described below with reference to the drawings. The following embodiments are just examples and it is possible to appropriately combine embodiments and appropriately modify each embodiment.

First Embodiment

Configuration

Figure 1:
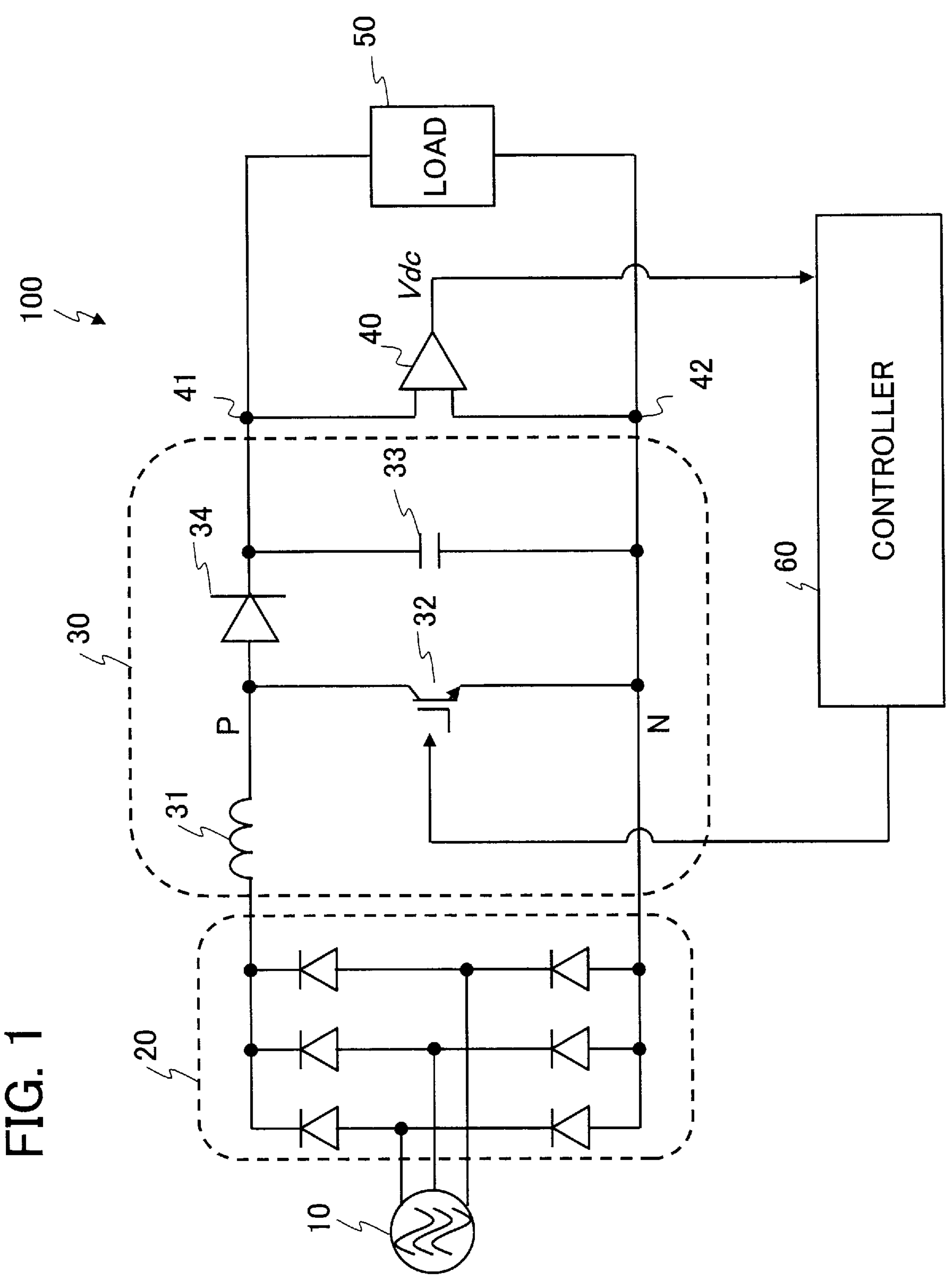
FIG. 1 is a diagram showing the configuration of an electric power conversion device according to a first embodiment.

FIG. 1 is a diagram showing the configuration of an electric power conversion device 100 according to a first embodiment. The electric power conversion device 100 converts alternating current (AC) supplied from an alternating current power supply (i.e., AC power supply) 10 into direct current (DC) and supplies the direct current from output terminals 41 and 42 to a load 50. The alternating current is a three-phase alternating current, for example. In the first embodiment, the load 50 is assumed to be an inverter. However, the load 50 is not limited to an inverter. The inverter is capable of driving a motor. Thus, the electric power conversion device 100 and the inverter constitute a motor driving device.

The electric power conversion device 100 includes a rectifier circuit 20, a booster circuit (boost chopper circuit in the example of FIG. 1) 30, a voltage detector 40 and a controller 60. The rectifier circuit 20 rectifies an AC voltage supplied from the AC power supply 10 and outputs the rectified voltage (i.e., voltage before boosting). The booster circuit 30 supplies an output voltage (i.e., a voltage after the boosting) to the output terminals 41 and 42. The voltage detector 40 is a detection circuit to detect the voltage between the output terminals 41 and 42 and outputs a voltage detection value Vdc indicating the output voltage.

The booster circuit 30 includes a reactor 31 connected to the rectifier circuit 20, a smoothing capacitor 33 that generates the output voltage by smoothing the voltage rectified by the rectifier circuit 20, a switching element 32 that short-circuits the reactor 31 in a conduction period as a period of an ON state, and a diode 34 as a reverse current prevention element connected between the reactor 31 and the smoothing capacitor 33. The reactor 31 may be connected to either an input side or an output side of the rectifier circuit 20. The smoothing capacitor 33 and the switching element 32 are connected in parallel. The diode 34 prevents a reverse flow of current from the smoothing capacitor 33 to the AC power supply 10.

The controller 60 controls the switching element 32 by outputting a drive signal to the switching element 32. The switching element 32 is on-off controlled. The conduction period is a period in which the switching element 32 is on, and a non-conduction period is a period in which the switching element 32 is off. The controller 60 controls the conduction period, namely, an ON period, of the switching element 32 based on the voltage detection value Vdc so that a pulsation frequency (referred to also as a "first pulsation frequency") as the frequency of the pulsation of the output voltage between the output terminals 41 and 42 (i.e., the voltage after the boosting) is higher than a pulsation frequency (referred to also as a "second pulsation frequency") as the frequency of the pulsation of the voltage rectified by the rectifier circuit 20 (i.e., the voltage before the boosting.

The switching element 32 is, for example, a semiconductor switching element such as a power transistor, a power MOSFET (Metal-Oxide-Semiconductor Field-Effect Transistor) or an IGBT (Insulated Gate Bipolar Transistor). A freewheeling diode (not shown) may be connected in parallel with the switching element 32 for the purpose of inhibiting surge voltage caused by the switching. Incidentally, the freewheeling diode can also be a parasitic diode of the switching element 32 being a semiconductor switching element. Further, the freewheeling diode can also be a MOSFET, and in this case, the MOSFET as the freewheeling diode is turned to the ON state with the timing of freewheeling. Further, the material forming the switching element 32 is not limited to silicon (Si). The switching element 32 can also be a wide band gap semiconductor. A decrease in the loss and an increase in the switching speed can be realized by forming the wide band gap semiconductor with silicon carbide (Sic), gallium nitride (GaN), gallium oxide ($Ga_2O_3$) or diamond.

The controller 60 controls the output voltage supplied from the output terminals 41 and 42 to the load 50 by performing the on-off control on the switching element 32. For example, the controller 60 adjusts ON-OFF times of the switching element 32 (i.e., adjusts a duty) by using proportional-integral (PI) control or the like so that an average value Vav of the voltage detection value Vdc of the voltage detector 40 becomes equal to a target voltage Vta. Incidentally, for the on-off control, it is desirable to use pulse-width modulation (PWM) control, for example. The controller 60 can be formed with a discrete system of a CPU (Central Processing Unit), a DSP (Digital Signal Processor) or a microcomputer (microcontroller). For example, the controller 60 can be a control circuit formed with an electric circuit or the like such as an analog circuit or a digital circuit.

Problems

Figure 2:
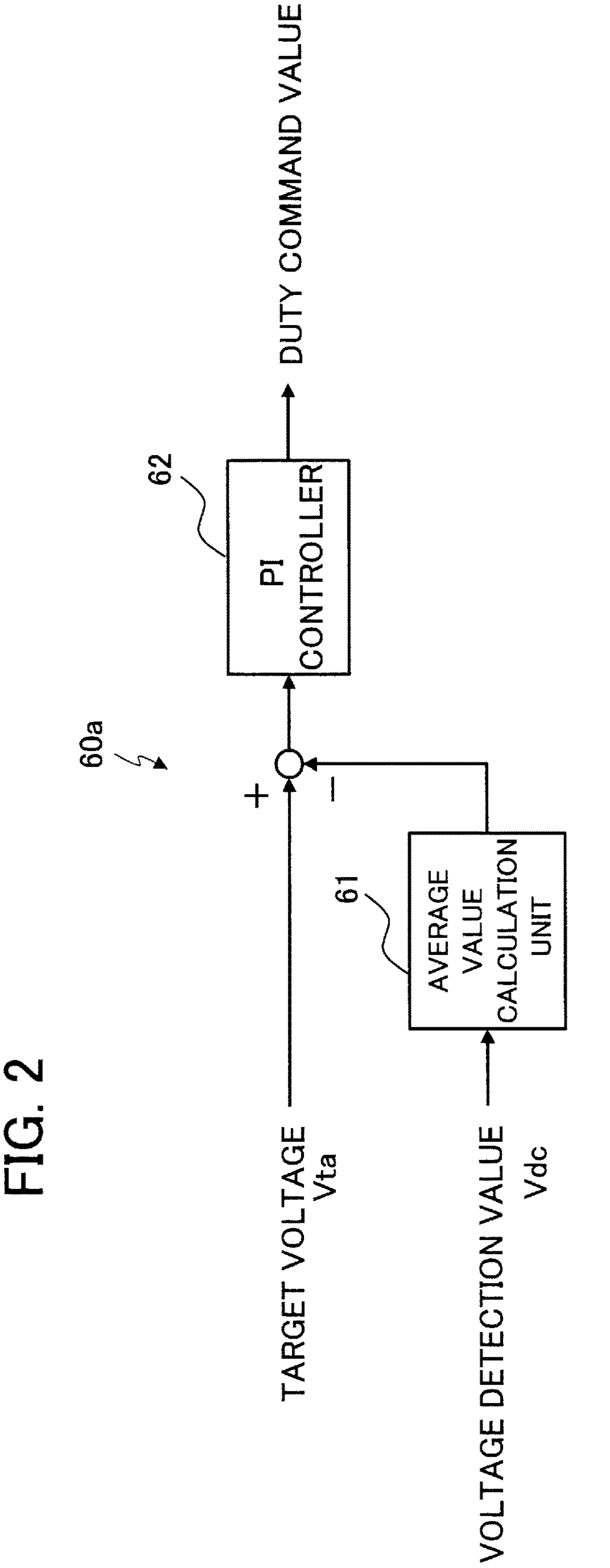
FIG. 2 is a block diagram showing the configuration of a controller of an electric power conversion device as a comparative example.
Figure 3:
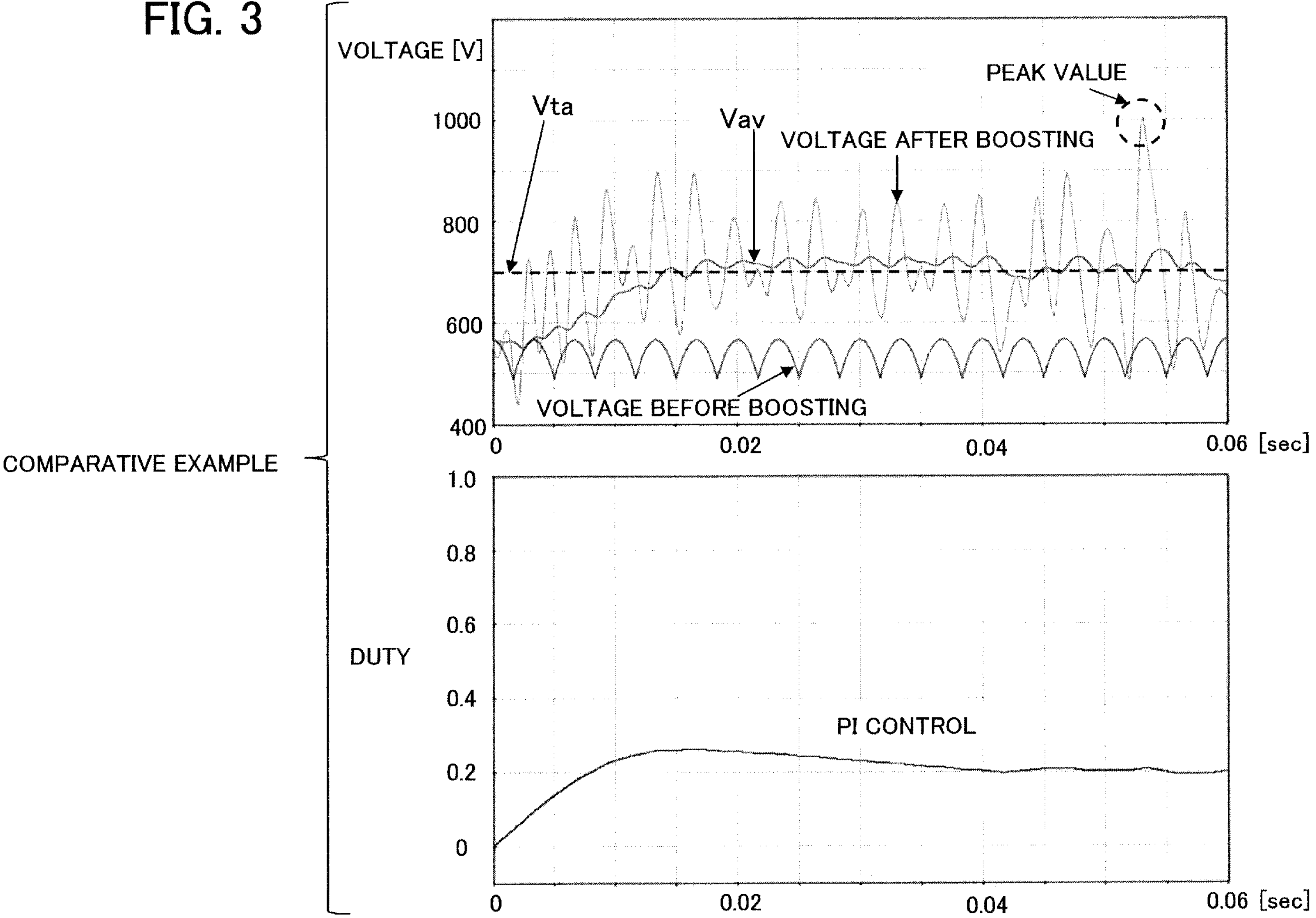
FIG. 3 is a diagram showing an example of operation waveforms of the electric power conversion device as the comparative example.

The problems to be solved by the first embodiment will be described below. FIG. 2 is a block diagram showing the configuration of a controller 60*a* of an electric power conversion device as a comparative example. The electric power conversion device in FIG. 2 differs from the electric power conversion device 100 in FIG. 1 in the configuration of the controller 60*a*. FIG. 3 is a diagram showing an example of operation waveforms of the electric power conversion device as the comparative example.

In the comparative example in FIG. 2, the controller 60*a* includes an average value calculation unit 61 that calculates the average value Vav of the voltage detection value Vdc and a PI controller 62 that executes the PI control based on the difference between the average value Vav and the target voltage Vta. For example, a capacitor having capacitance of approximately some hundreds of μF is used as the smoothing capacitor 33, and the duty of the switching element 32 (i.e., the ratio of the ON time of the switching element 32 to one control cycle, referred to also as a "PWM duty") is PI controlled so that the average value Vav of the voltage detection value Vdc of the voltage detector 40 becomes equal to the target voltage Vta as shown in FIG. 3. In this case, great pulsation of amplitude occurs to terminal voltage of the smoothing capacitor 33 (i.e., the output voltage between the output terminals 41 and 42) as indicated as the waveform after the boosting. A pulsation frequency as the frequency of the pulsation of the terminal voltage of the smoothing capacitor 33 is n times (n: positive integer) the frequency of the AC voltage inputted to the rectifier circuit 20. The positive integer n is 2 when the AC voltage is a single-phase AC voltage, and is 6 when the AC voltage is three-phase AC voltage. Even though the average value Vav of the terminal voltage of the smoothing capacitor 33 is boosted, the beat phenomenon occurs due to the great pulsation. Further, there is a danger that a voltage peak value (e.g., a part of the waveform surrounded by a broken line circle in an upper part of FIG. 3) becomes excessively high, exceeds withstand voltage of the inverter, and causes a breakdown of an element as a component of the inverter.

To resolve such problems, in the first embodiment, the controller 60 controls the conduction period (namely, the ON period) of the switching element 32 based on the voltage detection value Vdc so that the first pulsation frequency as the frequency of the pulsation of the terminal voltage of the smoothing capacitor 33 (i.e., the output voltage between the output terminals 41 and 42) is higher than the second pulsation frequency as the frequency of the pulsation of the voltage before the boosting by the booster circuit 30 (i.e., the voltage rectified by the rectifier circuit 20). By this control, the peak value of the terminal voltage of the smoothing capacitor 33 is reduced.

Operation

FIG. 4 is a block diagram showing the configuration of the controller 60 of the electric power conversion device 100 according to the first embodiment. In the first embodiment, the controller 60 includes the PI controller 62 that adjusts the duty (duty in the PI control) so that the average value Vav of the voltage detection value Vdc of the voltage detector 40 becomes equal to a predetermined target voltage Vta and a duty command switching unit 63 that outputs one of the output of the PI controller 62 and a predetermined duty (fixed duty). This fixed duty is referred to also as a "low duty" or a "first duty".

FIG. 5 is a flowchart showing the operation of the controller 60 of the electric power conversion device 100 according to the first embodiment. As shown in FIG. 5, the controller 60 compares the voltage detection value Vdc of the voltage detector 40 with a predetermined threshold value Vth (e.g., the target voltage Vta or the average value Vav of the voltage detection value Vdc) (step S11). Incidentally, a filter process for removing noise or the like at the time of the detection may be performed on the voltage detection value Vdc of the voltage detector 40 on software or hardware.

When the voltage detection value is less than or equal to the threshold value Vth (NO in the step S11), the controller 60 makes the duty command switching unit 63 in FIG. 4 switch to a contact point A's side and executes the PI control (step S13). When the voltage detection value is greater than the threshold value Vth (YES in the step S11), the controller 60 makes the duty command switching unit 63 in FIG. 4 switch to a contact point B's side and executes the control of the switching element 32 at a fixed duty (step S12). The fixed duty is a value smaller than the duty of the PI control.

Figure 6:
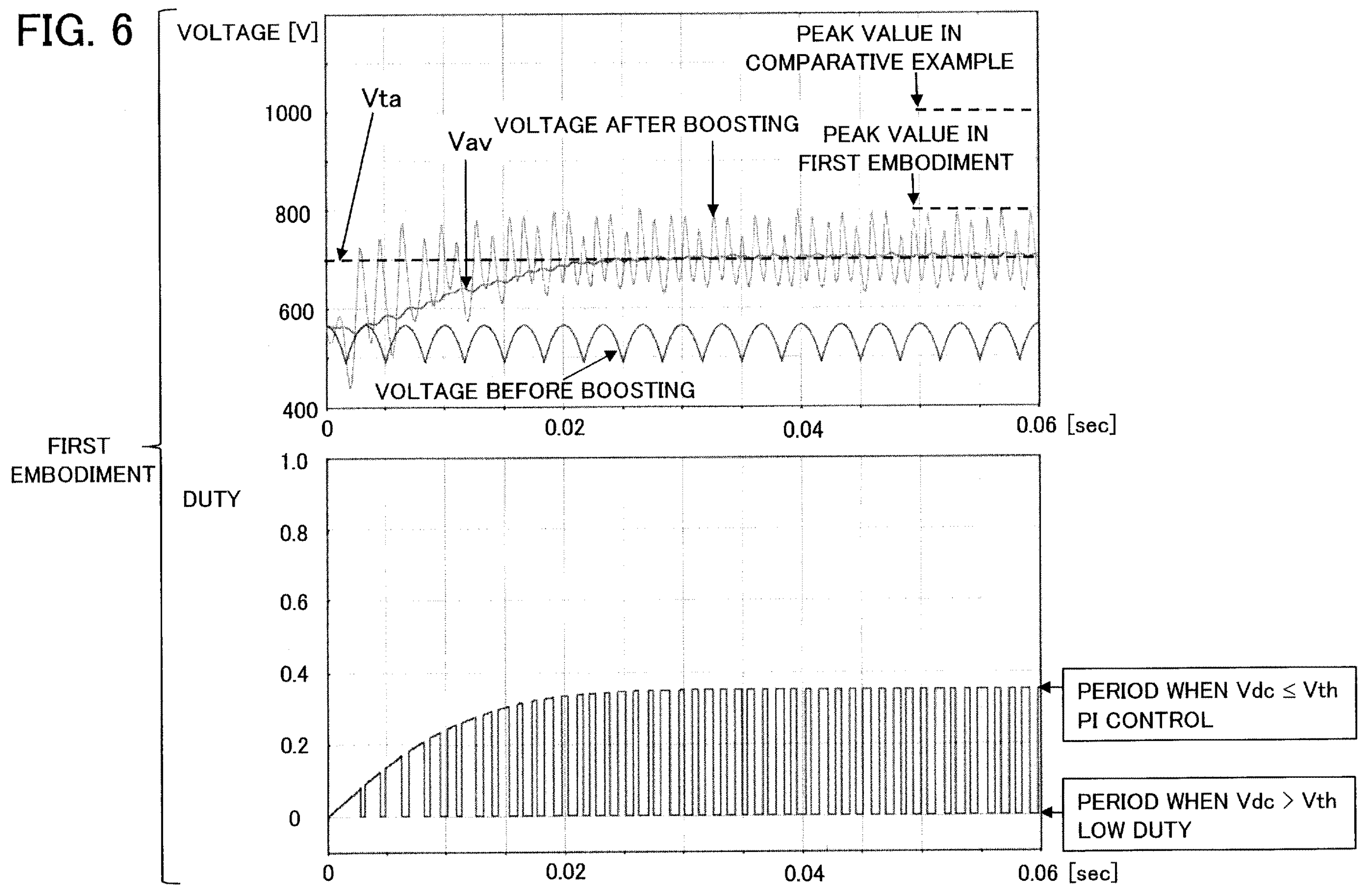
FIG. 6 is a diagram showing an example of operation waveforms of the electric power conversion device according to the first embodiment.

FIG. 6 is a diagram showing an example of operation waveforms of the electric power conversion device 100 according to the first embodiment. FIG. 6 shows the operation waveforms when the fixed duty is set at 0 and the threshold value Vth is set at the target voltage Vta. As shown in FIG. 6, by setting the duty at 0 when the average value Vav of the voltage detection value Vdc exceeds the threshold value Vth, the first pulsation frequency of the pulsation of the terminal voltage of the smoothing capacitor 33 (i.e., the output voltage) can be made higher than the second pulsation frequency of the pulsation of the voltage before the boosting, and the voltage peak value can be lowered.

The average value of the terminal voltage of the smoothing capacitor 33 may also be used as the threshold value Vth since the control in the first embodiment is executed so that the average value Vav of the terminal voltage of the smoothing capacitor 33 becomes equal to the target voltage Vta.

Effect

According to the first embodiment, when an inverter and a motor are used as the load 50 on the electric power conversion device 100, an operating range of the motor can be widened, and also when overmodulation control is executed, the beat is inhibited and that makes it possible to reduce vibration and noise of the motor.

Further, since the voltage peak can be lowered, overvoltage failure or the like of an apparatus can be prevented.

Second Embodiment

An electric power conversion device according to a second embodiment differs from the electric power conversion device 100 according to the first embodiment in the configuration and the operation of the controller. The controller of the electric power conversion device according to the second embodiment performs the PI control on the conduction period of the switching element 32 so as to bring the voltage detection value Vdc close to a predetermined target voltage Vta and executes control so that a gain Gb of the PI control when the voltage detection value Vdc is over the threshold value Vth is higher than a gain Ga of the PI control when the voltage detection value Vdc is less than or equal to the threshold value Vth.

Figure 7:
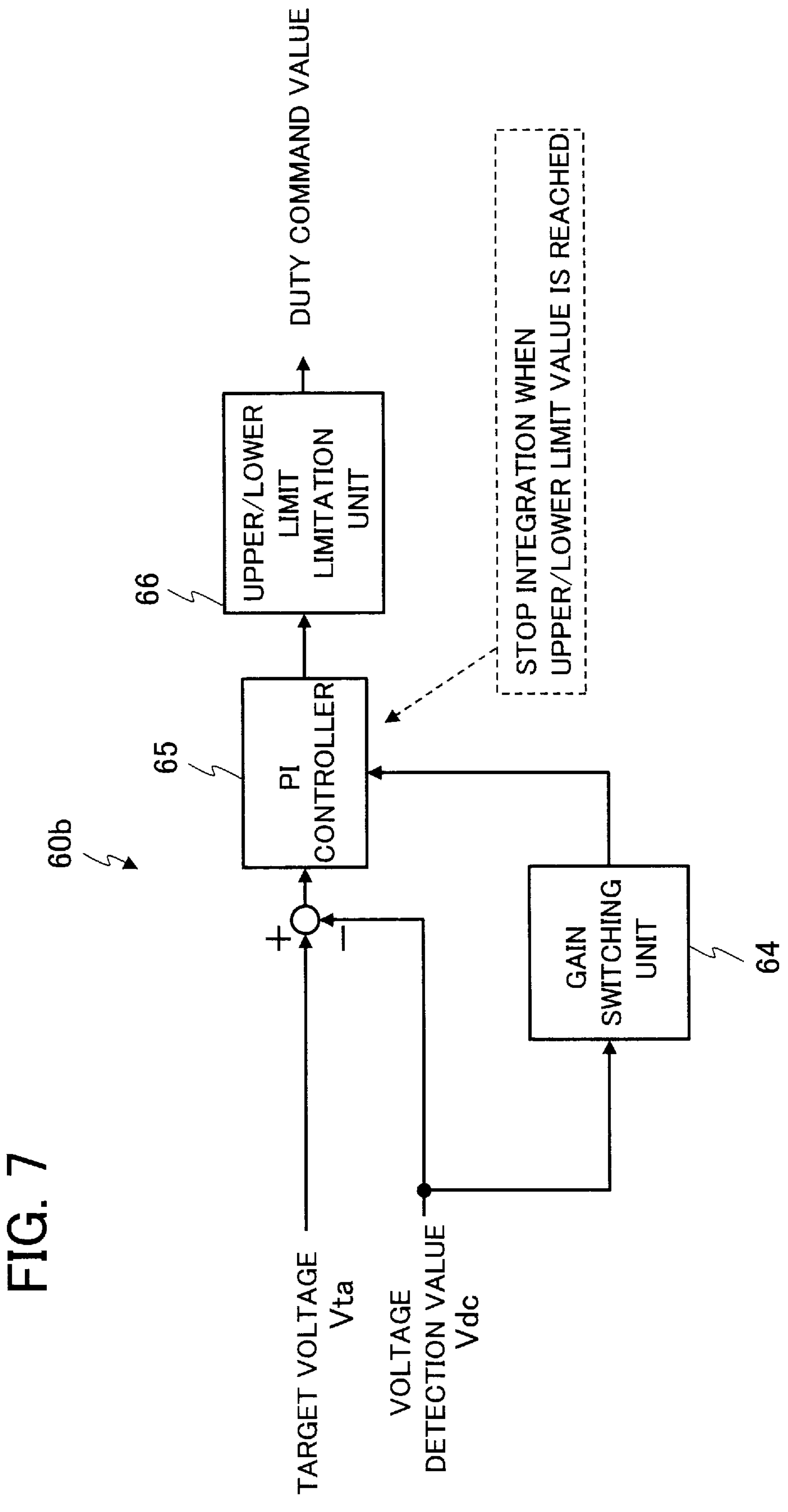
FIG. 7 is a block diagram showing the configuration of a controller of an electric power conversion device according to a second embodiment.

FIG. 7 is a block diagram showing the configuration of the controller 60*b* of the electric power conversion device according to the second embodiment The controller 60*a* includes a gain switching unit 64, a PI controller 65 and an upper/lower limit limitation unit 66. However, the controller 60*b* not including the upper/lower limit limitation unit 66 is also possible. The gain switching unit 64 switches a control gain used for the PI control by the PI controller 65 to either a predetermined gain Ga or Gb based on the result of comparison between the voltage detection value Vdc and the threshold value Vth. Here, Gb>Ga holds. Incidentally, the threshold value Vth may be set at a value equal to the target voltage Vta or the average value Vav of the voltage detection value Vdc, for example.

Further, since the switching of the control gain can cause a sharp change in the result of the integration by the PI controller 65, retreat (i.e., temporary storing) and restoration of the integral value are executed. Furthermore, in order to prevent the output of the PI controller 65 from becoming excessively high or excessively low, providing the upper/lower limit limitation unit 66 is desirable. In cases where the upper/lower limit limitation unit 66 is provided, it is desirable to execute an antiwindup operation to prevent unnecessary integration from being executed when the output of the PI controller 65 has reached an upper limit value or a lower limit value that has been set in the upper/lower limit limitation unit 66. An example of the antiwindup operation is an operation of stopping the integration operation.

Figure 8:
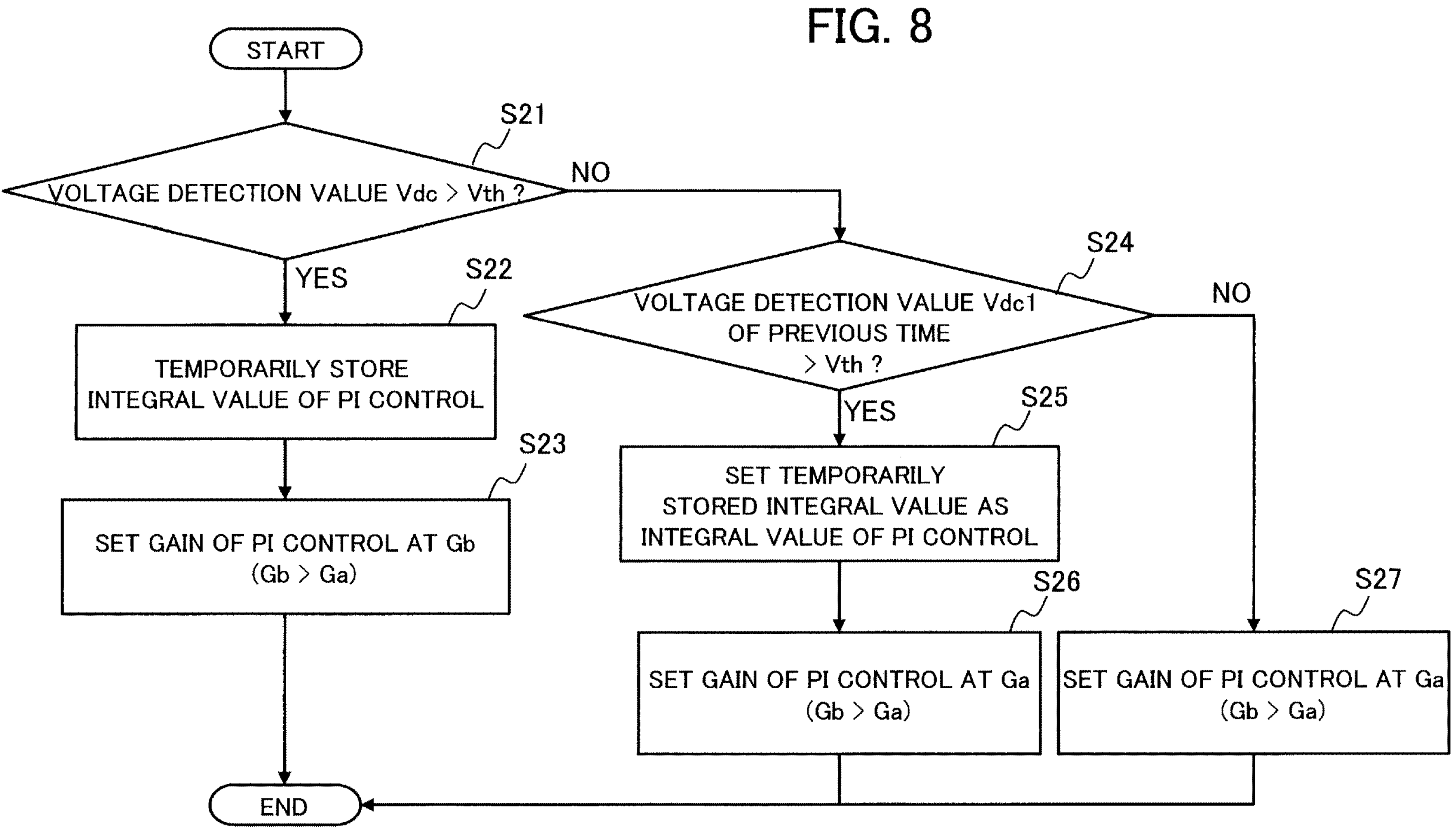
FIG. 8 is a flowchart showing the operation of the controller of the electric power conversion device according to the second embodiment.

FIG. 8 is a flowchart showing the operation of the controller 60*b* of the electric power conversion device according to the second embodiment. The controller 60*b* compares the voltage detection value Vdc of the voltage detector 40 with a previously set threshold value Vth (step S21).

When the voltage detection value Vdc is less than or equal to the threshold value Vth (NO in the step S21), the controller 60*b* compares a voltage detection value Vdc1 of the previous time with the threshold value Vth (step S24). When the voltage detection value Vdc1 of the previous time is less than or equal to the threshold value Vth (NO in the step S24), the controller 60*b* sets the control gain to be used by the PI controller 65 at the gain Ga (step S27). When the voltage detection value Vdc1 of the previous time is greater than the threshold value Vth (YES in the step S24), the controller 60*b* sets the temporarily stored integral value as the integral value of the PI control (step S25) and sets the control gain to be used by the PI controller 65 at the gain Ga (step S26).

When the voltage detection value Vdc is greater than the threshold value Vth (YES in the step S21), the controller 60*b* temporarily stores the integral value of the PI control (step S22) and sets the control gain to be used by the PI controller 65 at the gain Gb (Gb>Ga) (step S27).

Figure 9:
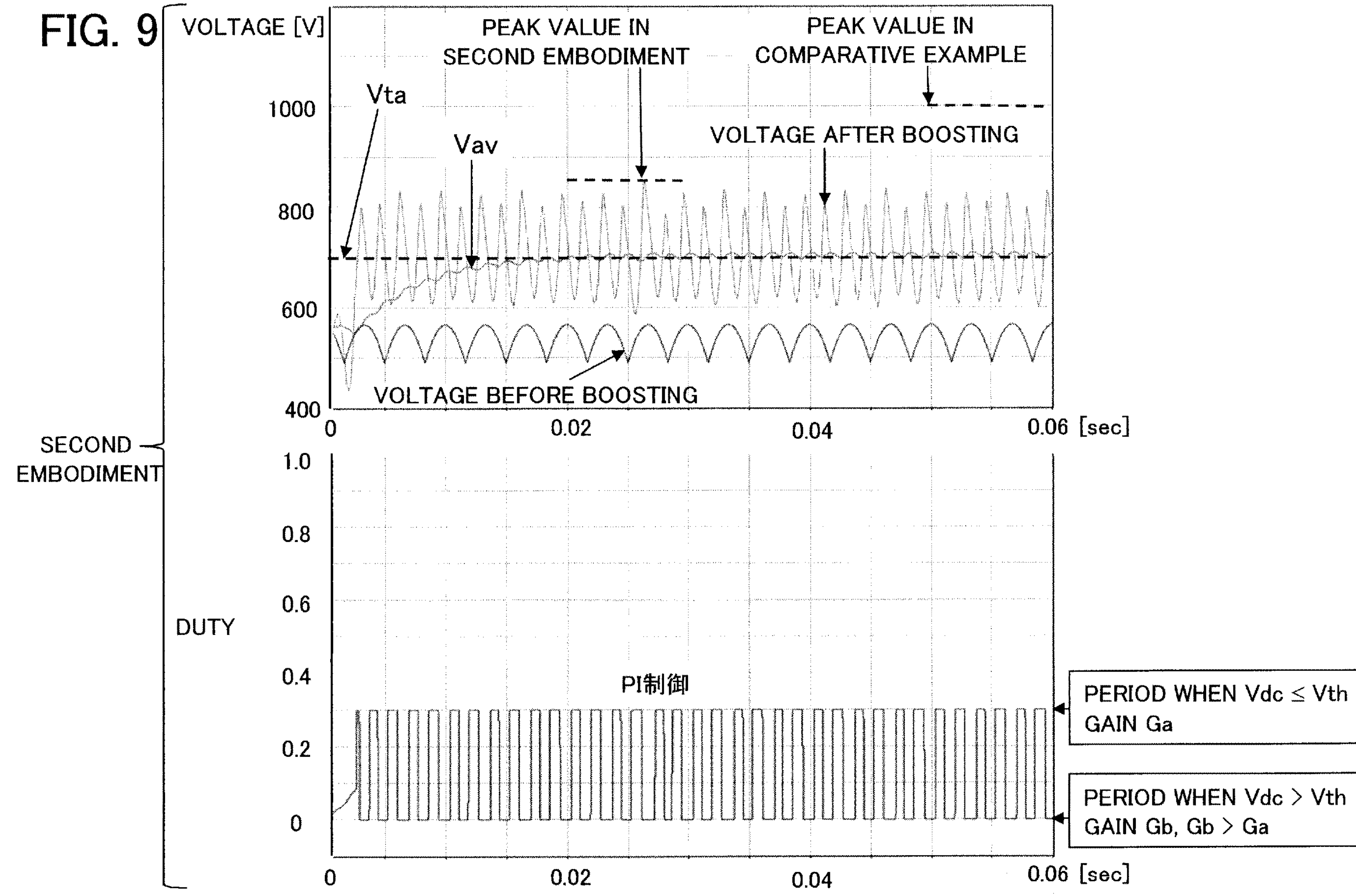
FIG. 9 is a diagram showing an example of operation waveforms of the electric power conversion device according to the second embodiment.

FIG. 9 is a diagram showing an example of operation waveforms of the electric power conversion device according to the second embodiment. In the second embodiment, the controller 60*b* performs the PI control on the conduction period of the switching element 32 so as to bring the voltage detection value Vdc close to the target voltage Vta and executes control so that the gain Gb of the PI control when the voltage detection value Vdc is over the threshold value Vth is higher than the gain Ga of the PI control when the voltage detection value Vdc is less than or equal to the threshold value Vth. Therefore, the pulsation of the output voltage of the output terminals 41 and 42 (i.e., the voltage after the boosting by the booster circuit 30) can be reduced as shown in FIG. 9.

Third Embodiment

Figure 10:
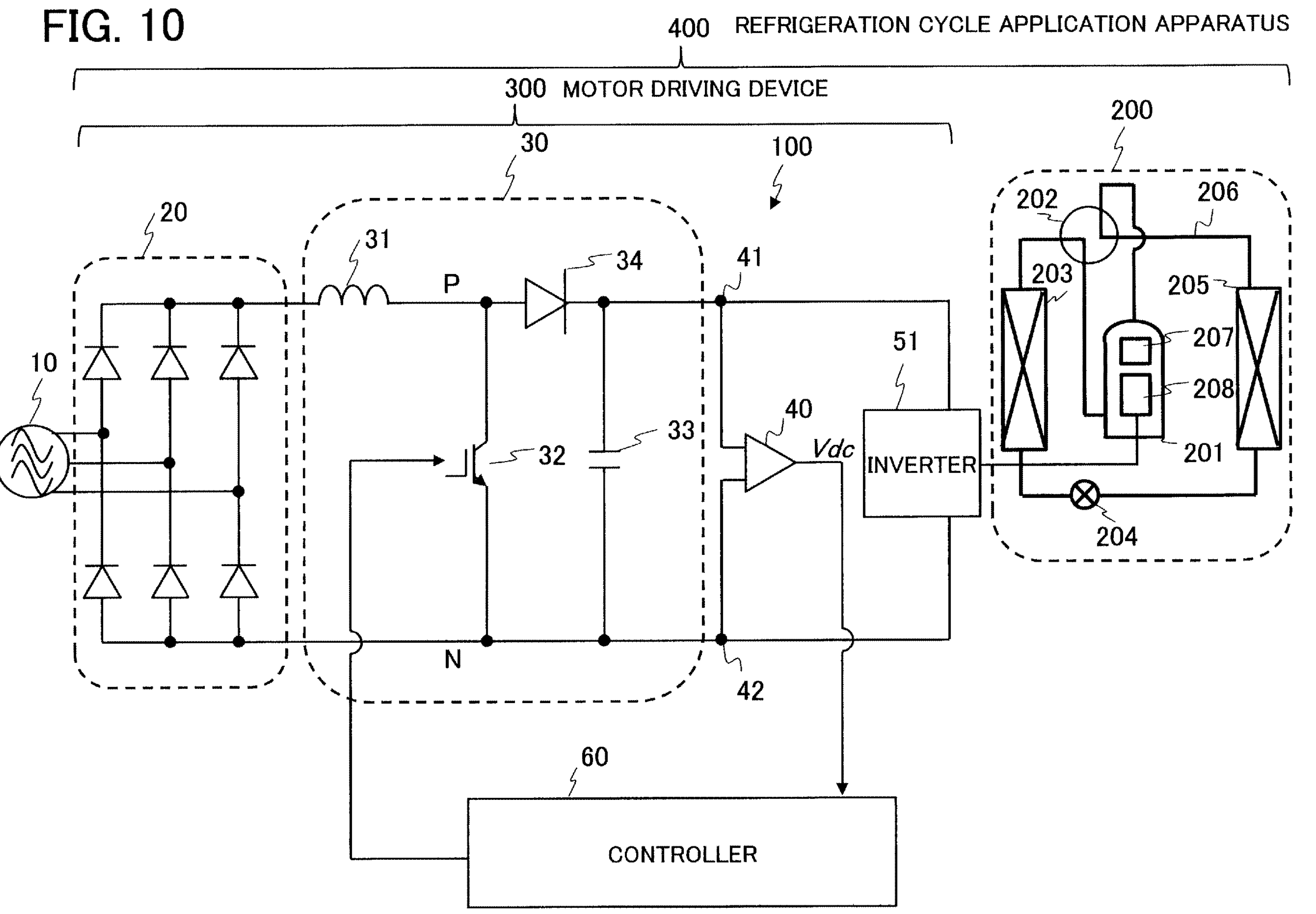
FIG. 10 is a diagram showing the configuration of a motor driving device and a refrigeration cycle application apparatus according to a third embodiment.

FIG. 10 is a diagram showing the configuration of a motor driving device 300 and a refrigeration cycle application apparatus 400 according to a third embodiment. The motor driving device 300 includes the electric power conversion device 100 and an inverter 51 as the load. The refrigeration cycle application apparatus 400 includes the motor driving device 300 and a refrigeration cycle device 200. The refrigeration cycle application apparatus 400 is an air conditioner, a refrigerator, or the like, for example. The electric power conversion device according to the first or second embodiment can be used as the electric power conversion device 100.

The refrigeration cycle device 200 includes a compressor 201, a four-way valve 202, an internal heat exchanger 203, an expansion mechanism 204, a heat exchanger 205, and refrigerant piping 206 successively connecting these components. Further, a compression mechanism 207 for compressing a refrigerant and a motor 208 for driving the compression mechanism 207 are provided inside the compressor 201. Furthermore, the motor 208 is driven by the inverter 51 that is connected to the electric power conversion device 100 as the load.

Figures 11A, 11B:
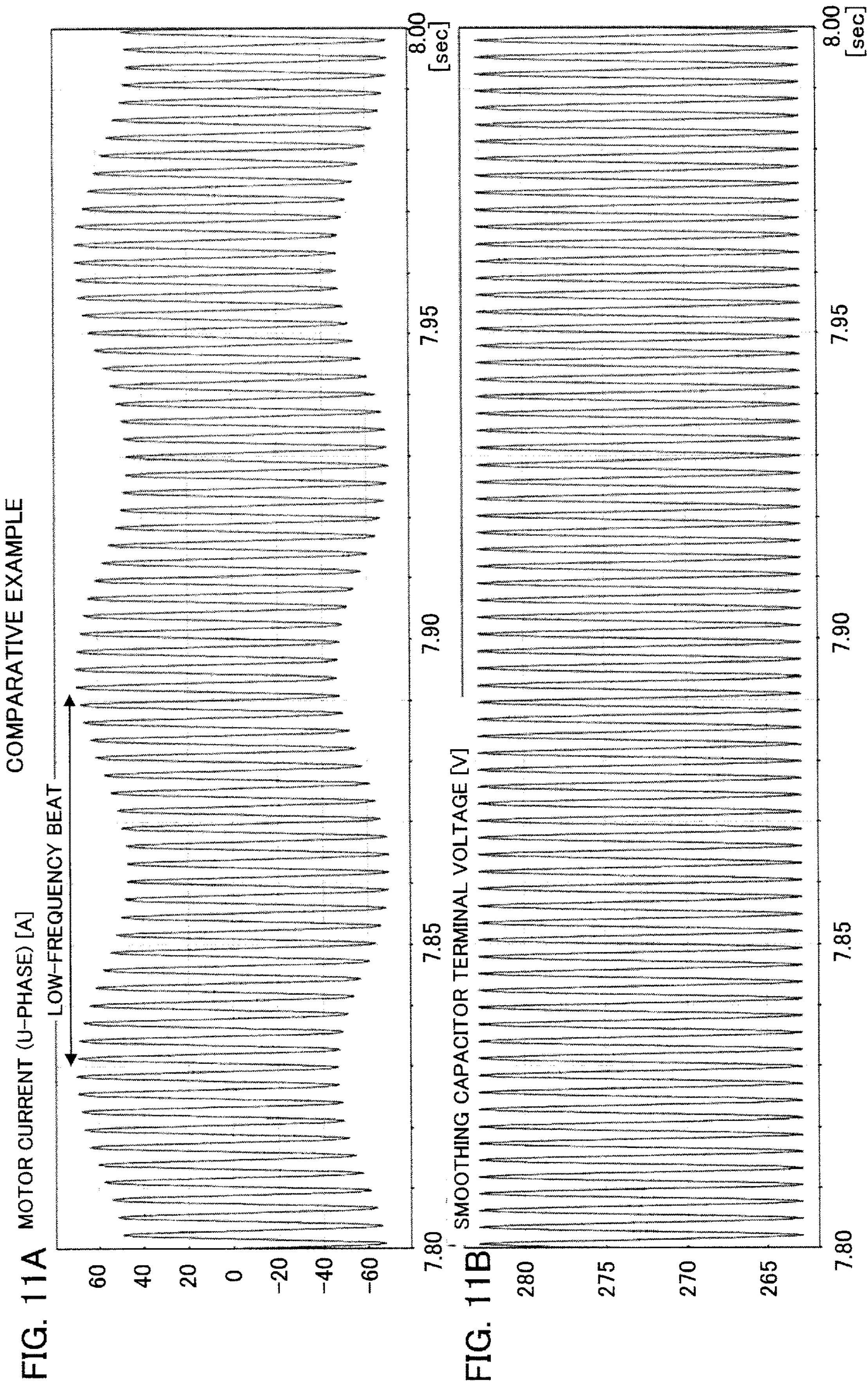
FIGS. 11A and 11B are diagrams showing an example of operation waveforms of a motor driving device as a comparative example.

FIGS. 11A and 11B are diagrams showing an example of operation waveforms of a motor driving device as a comparative example. In the motor driving device as the comparative example, the controller 60*a* (shown in FIG. 2) differs from the controller 60 or 60*b* in the first or second embodiment and does not execute the process of controlling the conduction period of the switching element 32 so that the first pulsation frequency of the output terminals is higher than the second pulsation frequency of the rectified voltage. As shown in FIG. 11A, in the motor driving device as the comparative example, due to influence of the pulsation of the terminal voltage of the smoothing capacitor 33, a low-frequency beat can be superimposed on the current flowing into the motor 208 and can cause deterioration in the vibration and the noise. In this case, the pulsation frequency of the terminal voltage of the smoothing capacitor 33 is n times the frequency of the AC voltage inputted to the rectifier circuit 20. Here, n is 2 when the AC voltage is a single-phase AC voltage, and is 6 when the AC voltage is three-phase AC voltage.

Figures 12A, 12B:
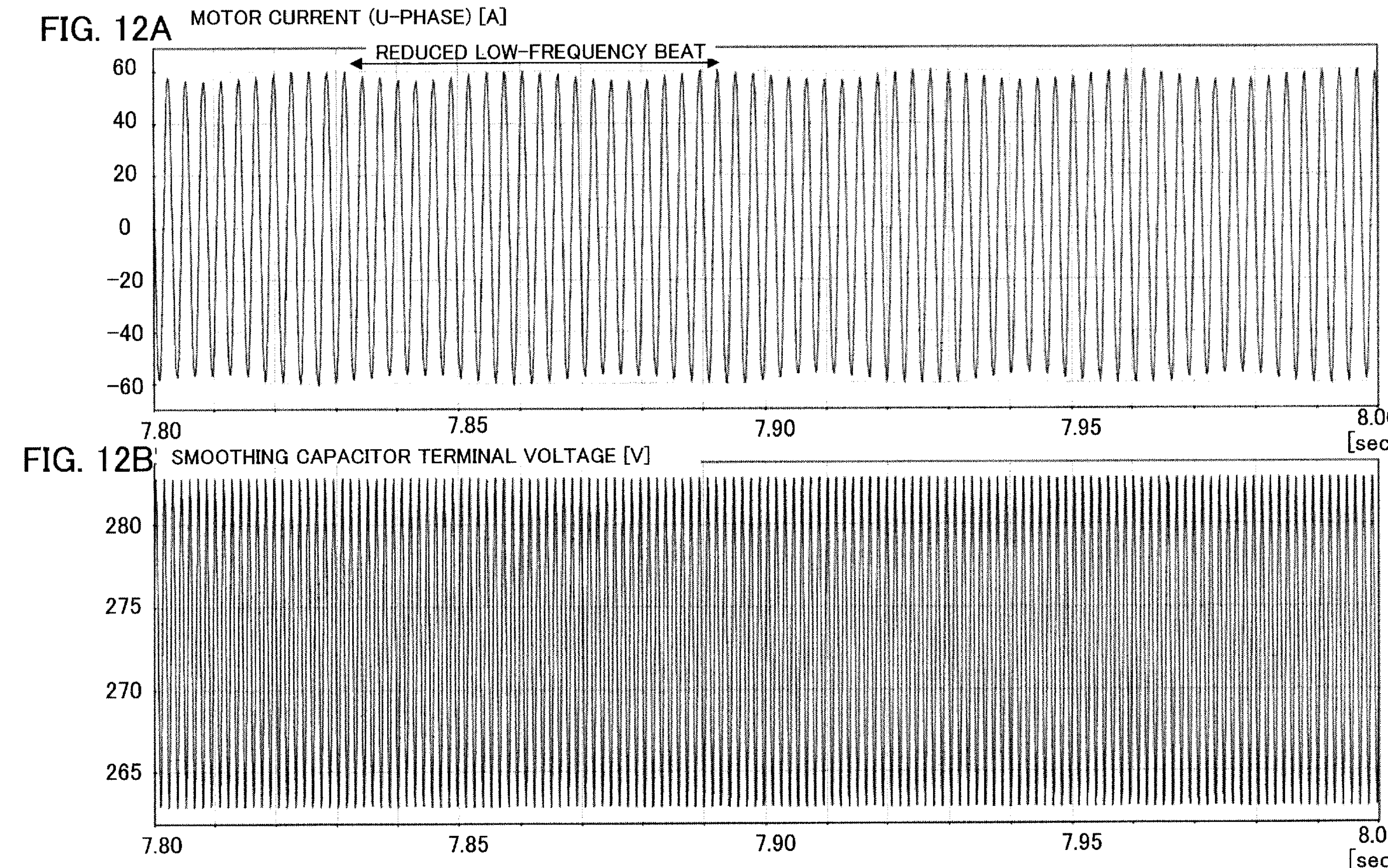
FIGS. 12A and 12B are diagrams showing an example of operation waveforms of the motor driving device according to the third embodiment.

FIGS. 12A and 12B are diagrams showing an example of operation waveforms of the motor driving device 300 according to the third embodiment. In the third embodiment, the controller (i.e., the controller 60 or 60*b*) controls the conduction period of the switching element 32 based on the voltage detection value Vdc so that the first pulsation frequency of the output voltage (e.g., pulsation frequency of the pulsation shown in FIG. 12B) is higher than the second pulsation frequency as the frequency of the pulsation of the rectified voltage. That is, in the motor driving device 300 according to the third embodiment, the pulsation frequency of the terminal voltage of the smoothing capacitor 33 can be made high.

For example, when the electric power conversion device 100 according to the first embodiment is used as the electric power conversion device of the motor driving device 300, the pulsation frequency is approximately twice compared to the pulsation frequency in the case of the comparative example shown in FIG. 3 as indicated in FIG. 6 as the voltage after the boosting. FIG. 12A shows the operation waveform in the case where the pulsation frequency of the terminal voltage of the smoothing capacitor 33 is set approximately twice the pulsation frequency in FIG. 11B of the comparative example as shown in FIG. 12B. It can be seen in FIG. 12A that the low-frequency beat is reduced successfully by raising the pulsation frequency. Accordingly, reduction in the vibration and the noise of the apparatus can be realized.

As described above, in the motor driving device 300 according to the third embodiment, the pulsation of the voltage applied to the inverter 51 is reduced by using the electric power conversion device according to the first or second embodiment, and thus the low-frequency beat can be reduced. Consequently, the reduction in the vibration and the noise can be realized in the refrigeration cycle application apparatus 400 including the motor driving device 300.

What is claimed is:

1. An electric power conversion device for supplying an output voltage to a load from output terminals, comprising:

a rectifier circuit to rectify an AC voltage and to output a rectified voltage;

a booster circuit to supply the output voltage to the output terminals;

a voltage detector to detect the output voltage and to output a voltage detection value indicating the output voltage; and a controller, wherein the booster circuit has a reactor connected to the rectifier circuit, a smoothing capacitor to smooth the rectified voltage, thereby generating the output voltage, and a switching element to short-circuit the reactor during a conduction period which is a period of an ON state of the switching element, and the controller controls the conduction period of the switching element based on the voltage detection value so that a first pulsation frequency which is a frequency of pulsation of the output voltage is higher than a second pulsation frequency which is a frequency of pulsation of the rectified voltage, wherein the controller controls the conduction period for times when the voltage detection value is less than or equal to a predetermined threshold value so as to bring an average value of the voltage detection value close to a predetermined target voltage, and controls the conduction period for times when the voltage detection value is over the threshold value so that the conduction period becomes shorter than the conduction period for times when the voltage detection value is less than or equal to the threshold value.

2. The electric power conversion device according to claim 1, wherein when the voltage detection value is less than or equal to a predetermined threshold value, the controller controls a duty of the switching element so as to bring the average value of the voltage detection value close to the target voltage, and when the voltage detection value is over the threshold value, the controller executes control by use of a predetermined first duty lower than the duty so as to bring the average value of the voltage detection value close to the target voltage.

3. The electric power conversion device according to claim 2, wherein the first duty is 0.

4. The electric power conversion device according to claim 1, wherein the threshold value is equal to the target voltage or the average value of the voltage detection value.

5. A motor driving device comprising:

the electric power conversion device according to claim 1; and an inverter to convert the output voltage to an AC voltage and to supply the AC voltage to a motor.

6. A refrigeration cycle application apparatus comprising:

the motor driving device according to claim 5; and a refrigeration cycle device having a motor driven by the motor driving device.

7. An electric power conversion device for supplying an output voltage to a load from output terminals, comprising:

a rectifier circuit to rectify an AC voltage and to output a rectified voltage;

a booster circuit to supply the output voltage to the output terminals;

a voltage detector to detect the output voltage and to output a voltage detection value indicating the output voltage; and a controller, wherein the booster circuit has a reactor connected to the rectifier circuit, a smoothing capacitor to smooth the rectified voltage, thereby generating the output voltage, and a switching element to short-circuit the reactor during a conduction period which is a period of an ON state of the switching element, and the controller controls the conduction period of the switching element based on the voltage detection value so that a first pulsation frequency which is a frequency of pulsation of the output voltage is higher than a second pulsation frequency which is a frequency of pulsation of the rectified voltage, wherein the controller performs PI control on the conduction period so as to bring the voltage detection value close to a predetermined target voltage, and executes control so that a gain of the PI control when the voltage detection value is over a predetermined threshold value is higher than a gain of the PI control when the voltage detection value is less than or equal to the threshold value.

8. The electric power conversion device according to claim 7, wherein the controller has an upper/lower limit limitation unit to control a duty commanding the conduction period of the switching element, to be greater than or equal to a predetermined lower limit value and less than or equal to a predetermined upper limit value.

9. The electric power conversion device according to claim 7, wherein the threshold value is equal to the target voltage or an average value of the voltage detection value.

10. A motor driving device comprising:

the electric power conversion device according to claim 7; and an inverter to convert the output voltage to an AC voltage and to supply the AC voltage to a motor.

11. A refrigeration cycle application apparatus comprising:

the motor driving device according to claim 10; and a refrigeration cycle device having a motor driven by the motor driving device.

* * * * *